Patented Jan. 18, 1949

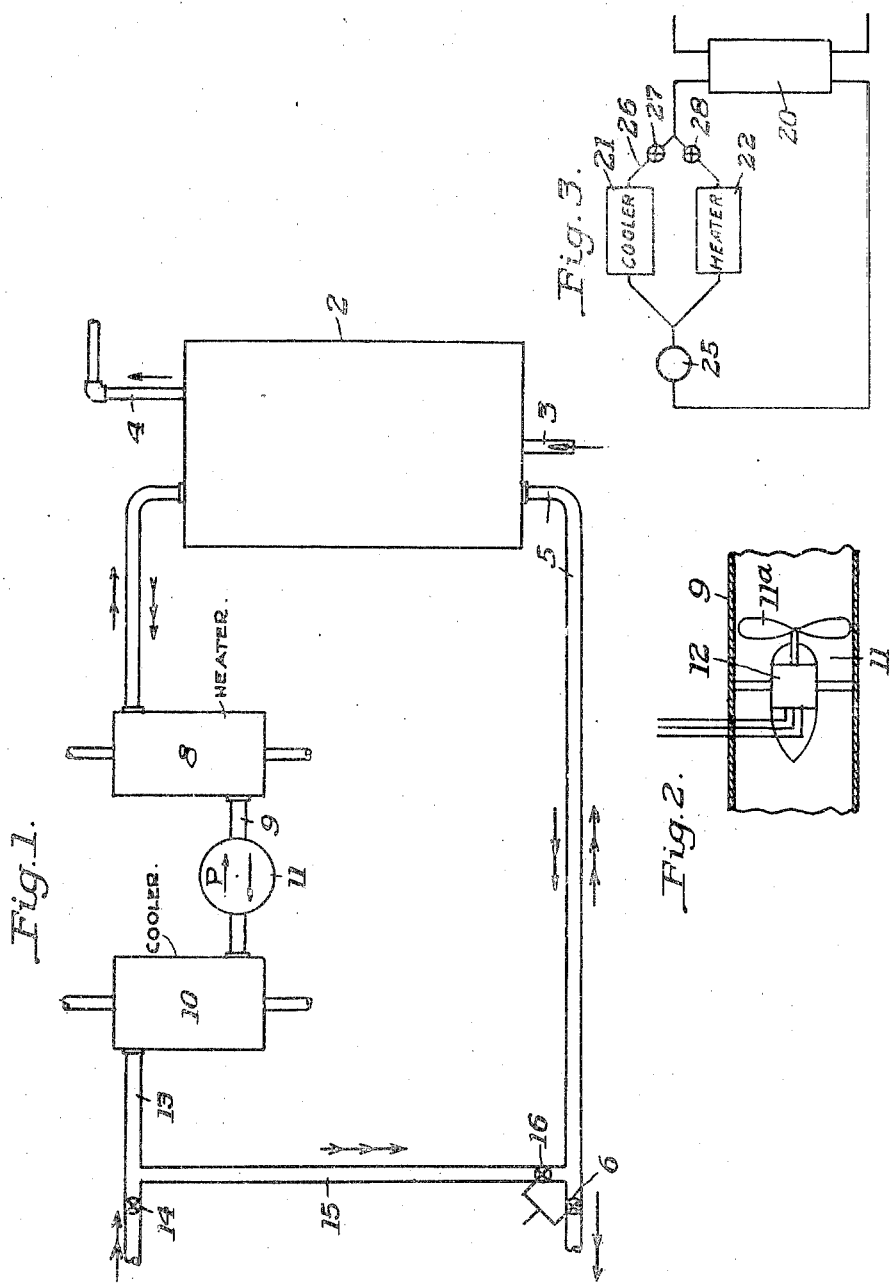

2,459,463

UNITED STATES PATENT OFFICE 2,459,463

GAS TREATING METHOD AND APPARATUS

George L. Simpson, Coraopolis Heights, Pa., assignor to Delaware Engineering Corporation, Pittsburgh, Pa., a corporation of Delaware Application May 5, 1944, Serial No. 534,211

6 Claims. (Cl. 34—13)

This invention pertains to the treatment of gas, by contacting the gas with an adsorptive, catalytic or other reagent, as for example, the drying or purifying of a gas by bringing it into contact with an adsorptive material, and it will be in connection with such treatment that the invention will be hereinafter described.

Apparatus for the drying or purifying of gas by the general method of contacting it with an adsorptive material is well known and extensively used in industry. In many cases, the effluent treated gas must have the absolute, minimum of moisture or other condensible or extractable impurities, and it is for such systems, especially, that the present invention pertains. In systems of this character, the gas to be treated is passed for a period of time through an adsorber unit until the adsorptive material has become contaminated with moisture or other impurities to a point where the safe limit of its adsorptive capacity has been reached. Then the flow of gas to be treated is stopped and the unit is reactivated. This may be accomplished by circulating gas, in some cases air, through the adsorptive material and applying heat whereby adsorbed impurities are evaporated and carried away (and in some cases some impurities are even oxidized in the adsorber unit). During this reactivation cycle, the adsorbent material is heated to a substantial degree above its normal operating temperature, and since the adsorbent is usually an earthen material it does not readily dissipate its heat. This renders it necessary to artificially cool the reagent, after it has been activated, to a point where the temperature of the reagent will be normal, that is, low enough so that it will retain the evaporable impurities or moisture that it extracts from the gas to be treated before the unit goes back on an operating cycle. In other words, if the reagent were not cooled, it would be ineffective to extract or retain moisture or other condensible impurities.

In many such installations, the equipment is very large and expensive, and this is especially true of valves. Moreover, in the activating cycle, when the adsorbent is being heated, it is desirable that the driest and hottest air (or other drying gas) enter the end of the adsorber unit from which the treated gas, on the operating cycle, leaves the unit. On the cooling cycle, there is apt to be a condensation of moisture, so that the cooling air or other gas should flow through the unit in the opposite direction, whereby moisture in the cooling gas is deposited in the adsorbent material furthest from the point where the gas being treated subsequently leaves, assuring thereby, that the effluent treated gas always last contacts the driest adsorbent in the unit.

My invention accomplishes this result with a minimum cost for equipment, and may be readily understood by reference to the accompanying drawings in which:

Fig. 1 is a schematic view of a system embodying my invention;

Fig. 2 is a longitudinal section showing an arrangement for a reversible circulating fan or pump; and Fig. 3 is a view similar to Fig. 1 of a slightly modified system.

Referring first to Fig. 1, 2 designates an adsorber unit of a type well known in the art having a gas inlet pipe 3 at one end (the bottom) through which gas to be treated is supplied to the adsorber, and 4 is a pipe at the other end (the top) for effluent dried, cleaned, purified or treated gas.

Also leading into the inlet or bottom end of the unit 2 is a duct 5 having a valve 6 at its end remote from the unit. Leading from the heater 8 is a duct 9 connecting with a cooler 10.

In the connecting duct 9, or elsewhere in the circuit is a reversible pump 11 or fan driven by a reversible motor. This is shown in Fig. 2 where the fan blade is designated 11a and 12 is the reversible motor.

The cooler 10 is of conventional form, and from the cooler there is a duct 13 with a valve 14 at its end. A cross duct or pipe 15 connects pipes 5 and 13 to form a closed circulating system that includes the cooler, the fan, the heater and the adsorber unit. A valve 16 in the pipe 15 controls fluid flow therethrough and valve 16 may be mechanically connected with valve 6 so that when one valve is open the other is closed.

The operation of the system may now be described. It may be borne in mind that the single arrows designate flow of gas to be processed, double arrows (→→) indicate direction of flow of warm drying gas for reactivation, and the triple arrows (→→→) indicate the direction of flow of cooling gas.

At the conclusion of the operating cycle, the flow of gas to the unit through pipe 3 is shut off. The valve 14 is then opened, valve 6 is opened, valve 16 is closed, the heater 8 is put into operation, and pump or reversible blower 11 is put into operation. At this time cooler 10 is not operating. Gas entering valve 14 flows through duct 13, is blown through the heater, enters the adsorber 2 at its discharge or top end, passes through the adsorber into pipe 5 and discharges through valve 6. Thus the warmest, driest air which is most effective for completely reconditioning the adsorbent material enters the adsorbing body through which the effluent gas (in subsequent operation of the unit) is most thoroughly reactivated.

After the reactivating cycle has been completed, the unit must be cooled down. Thereupon valve 6 and 14 are closed and valve 16 is opened. Operation of the heater 8 is stopped and cooler 10 is put into operation. The cooling of the gases may condense residual moisture in the system, and if the direction of circulation of the gases were not reversed this moisture would first contact the adsorbent material in the effluent gas end (top) of the unit 2 and the moisture would be adsorbed in this part of the unit, defeating the plan to have this part of the unit driest. Hence, when the cooler is put into operation, the motor 12 is reversed, reversing the direction of gas flow. This causes the cooling gas to enter the inlet (bottom) end of the adsorber, and it will be dried out before it reaches the effluent or discharge end of the unit so as to cool that part of the unit without contaminating the adsorbent material at that part of the unit. Moreover the gas used for cooling flows through a closed cycle to avoid introduction of additional moisture into the system, as might occur if gas were continuously supplied from an outside source.

After being cooled to operating temperature the fan, the cooler and heater may all be stopped and the unit may be put back onto an operating cycle. The use of a reversible blower or fan provides a simple way of reversing the flow of gas when changing from an activating to a cooling cycle at considerably less cost and complication than if the same result were secured by the use of a unidirectional pump and reversing valves.

In Fig. 3, the system is essentially the same but the heater and cooler are parallel instead of being in series. In this view 20 is the adsorber, 21 the cooler, 22 the heater and 25 is the reversible blower. The crossover pipe is designated 26. Valves 27 and 28 selectively control the flow through the heater and cooler, respectively. The operation will of course be similar to that previously described, but by reason of valves 27 and 28, this system is more expensive. It may be noted that in some cases the ducts will be as much as eight feet in diameter, and hence the valves are items of substantial size and cost.

While I have described certain specific embodiments of my invention, it will be understood that various changes may be made therein. Also, while I have described a gas drying process, the invention might likewise be applied to purification in other ways, or catalytic processes, and that the terms "adsorbing" and "adsorbing unit" are used in a general sense as referring to the contacting of gas and earthen or finely divided material.

I claim:

1. The combination with a gas treating unit of the adsorber type having a gas inlet pipe adjacent one end and a treated gas outlet at the other, of means for reconditioning the unit comprising a single gas circulating system independent of said gas inlet and outlet pipes connected to opposite ends of the unit, a reversible blower in said system, a heater and a cooler in said system which may be alternately operated, said reversible blower enabling heated gas to be introduced into that end of the adsorber on which the said outlet pipe is located when the heater is operating and cooled gas to be introduced into the other end of the unit when the cooler is operating.

2. The combination with a gas treating unit of the adsorber type having a gas inlet pipe adjacent one end and a treated gas outlet at the other, of means for reconditioning the unit comprising a single gas circulating system independent of the said gas inlet and outlet pipes connected to opposite ends of the unit, a reversible blower in said system, a heater and cooler in said system which may be alternately operated, said reversible blower enabling heated gas to be introduced into that end of the adsorber on which the said outlet pipe is located when the heater is operating and cooled gas to be introduced into the other end of the unit when the cooler is operating, and valve means selectively operable for controllably recycling gas through the said system and unit or continuously circulating new gas through the system.

3. The combination with a gas treating unit of the adsorber type having a gas inlet pipe adjacent one end and a treated gas outlet at the other, of means for reconditioning the unit comprising a gas circulating system having a pipe leading from one end of the unit and a pipe leading from the other end of the unit independent of the said gas inlet and outlet pipes, a valve in each of said pipes, a shunt pipe connecting said first two pipes located between the said valves and the unit whereby, when said valves are closed, gas may be continuously circulated through the unit, through the said first two pipes and through the shunt pipe, a valve in the shunt pipe for opening and closing the same against the flow of gas therethrough, selectively operable gas heating and cooling means in the system and comprising a part thereof whereby either hot or cold gas may be circulated through the unit, and means in the system for reversibly forcing gas through the system and unit whereby heated gas may be circulated in one direction when the heating means is operating and the cooling means is out of operation and cooled gas in the opposite direction when the cooling means is operating and the heating means is out of operation.

4. The combination with a gas treating unit of the adsorber type having a gas inlet pipe adjacent one end and a treating gas outlet at the other, of means for reconditioning the unit comprising a gas circulating system having a pipe leading from one end of the unit and a pipe leading from the other end of the unit, a valve in each of said pipes, a shunt pipe connecting said first two pipes located between the said valves and the unit whereby, when said valves are closed, gas may be continuously circulated through the unit, through the said first two pipes and through the shunt pipe, a valve in the shunt pipe for opening and closing the same against the flow of gas therethrough, selectively operable gas heating and cooling means in the system and comprising a part of the system, whereby either hot or cold gas may be circulated through the unit, and means in the system for reversing the direction of flow of gas through the system and unit whereby heated gas may be circulated in one direction when the heating means is operating and the cooling means is out of operation, and cooled gas in the opposite direction when the cooling means is operating and the heating means is out of operation, said last named means comprising a reversible blower.

5. The method of reconditioning a gas dryer, which dryer comprises an adsorber unit having a gas inlet end and a gas outlet end, said method comprising the steps of first supplying heated gas to the unit with the gas being continuously changed and with the heated gas flowing into the outlet end of the dryer and emerging from the inlet end of the dryer, and thereafter continuously recirculating cooled gas through the unit, the same gas being recycled and entering the inlet end thereof and leaving the unit at the dry gas discharge end thereof.

6. The combination with a gas dryer comprising an adsorber unit having a gas inlet and a gas outlet at opposite ends thereof, of a looped duct connected with opposite ends of the adsorber unit to provide a closed circulating system, a reversible blower in the duct for forcing a flow of gas therethrough in either direction, a gas heating unit and a gas cooling unit in the closed circulating system, each of which may be selectively operated, and valve means at one point in the duct for selectively connecting the system to a new source of gas supply, a second valve for closing the duct against the recycling of gas therethrough and preventing it from functioning as a looped system, and a third valve remote from the first through which gas may be vented from the system, the second valve being located between the first and third and in position to require gas to flow through the adsorber unit when the second valve is closed and the first and third valves are open.

GEORGE L. SIMPSON.

REFERENCES CITED

The following references are of record in the file of this patent:

UNITED STATES PATENTS

| Number | Name | Date |
|---|---|---|
| 53,293 | Godfrey | Mar. 20, 1866 |
| 843,909 | Peters et al. | Feb. 12, 1907 |
| 1,524,617 | Goubert | Jan. 27, 1925 |
| 1,934,301 | Godel | Nov. 7, 1933 |

FOREIGN PATENTS

| Number | Country | Date |
|---|---|---|
| 470,170 | Great Britain | Aug. 10, 1937 |
| 479,414 | Germany | July 16, 1929 |